Figure 1:
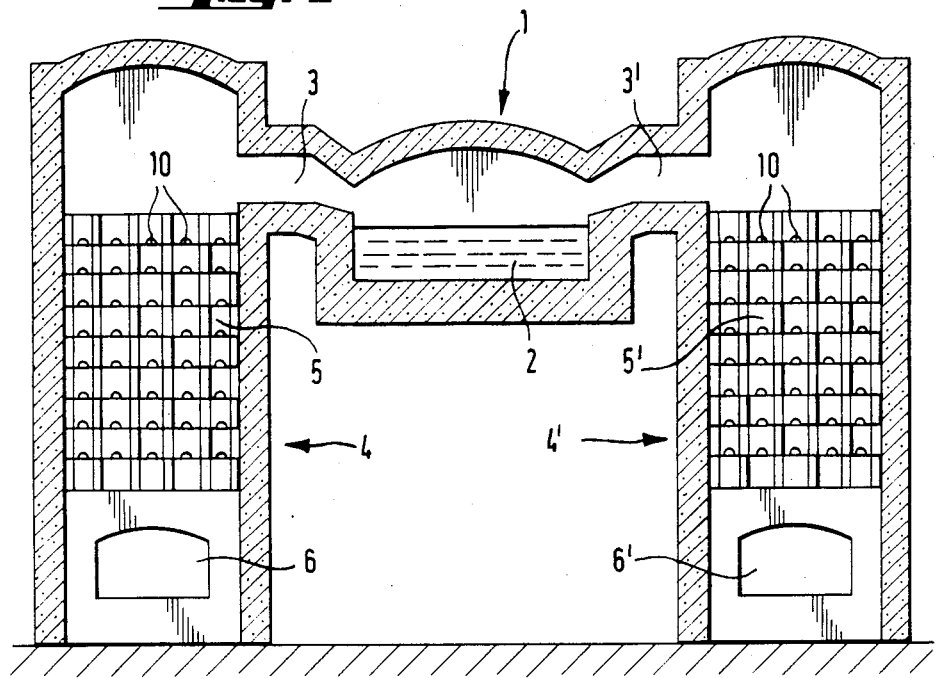

United States Patent [19]

Triessnig

[11] Patent Number: 4,651,810
[45] Date of Patent: Mar. 24, 1987

[54] CHECKERWORK FOR UPRIGHT REGENERATION CHAMBERS OF A GLASS MELTING FURNACE

[75] Inventor: Alois Triessnig, Vienna, Austria

[73] Assignee: Veitscher Magnesitwerke-Actien-Gesellschaft, Vienna, Austria

[21] Appl. No.: 875,283

[22] Filed: Jun. 16, 1986

[30] Foreign Application Priority Data

Jun. 28, 1985 [AT] Austria ............................ 1941/85

[51] Int. Cl.⁴ ............................................ F28D 17/02
[52] U.S. Cl. .................................... 165/9.2; 165/9.1; 432/180
[58] Field of Search ................ 165/9.1, 9.2, 9.3, 9.4; 432/180, 181, 182

[56] References Cited

U.S. PATENT DOCUMENTS 4,436,144 3/1984 Horak ................................ 165/9.1

FOREIGN PATENT DOCUMENTS 2746868 4/1979 Fed. Rep. of Germany ....... 165/9.2

Primary Examiner—Albert W. Davis, Jr.
Attorney, Agent, or Firm—Kurt Kelman

[57] ABSTRACT

A checkerwork for two upright regeneration chambers of a glass melting furnace defines a multiplicity of adjacently arranged vertical passages alternatingly providing upwardly directed fresh air flow and downwardly directed exhaust flow, the passages being connected by vertically spaced openings producing air turbulence, and the vertical distance between vertically adjacent openings becoming progressively smaller towards the uppermost checkerwork region.

10 Claims, 6 Drawing Figures

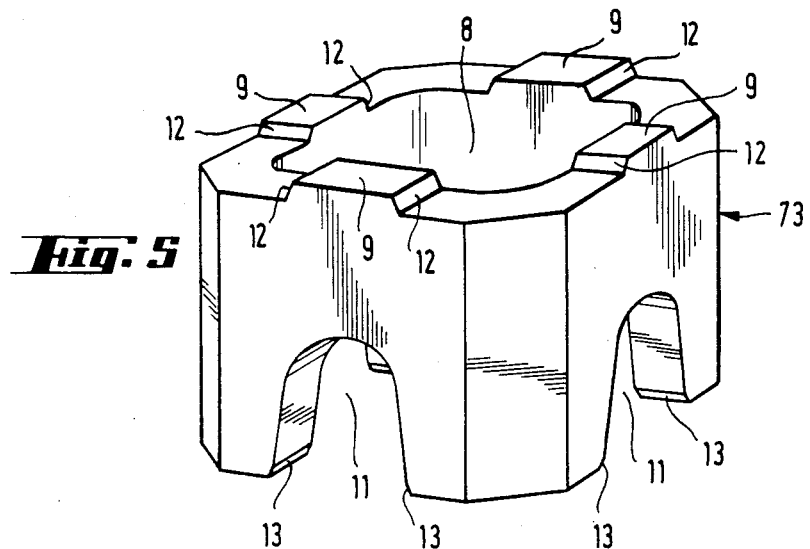
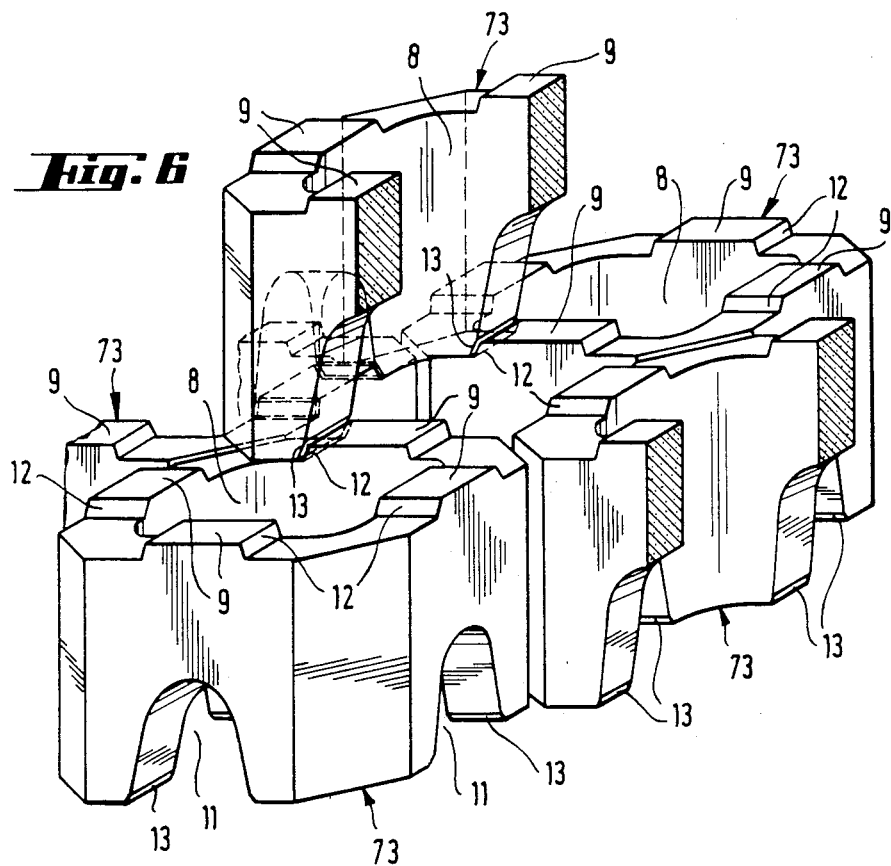

CHECKERWORK FOR UPRIGHT REGENERATION CHAMBERS OF A GLASS MELTING FURNACE

The present invention relates to a checkerwork for two upright regeneration chambers of a glass melting furnace, the checkerwork rising from a lowermost region to an uppermost region and defining a multiplicity of adjacently arranged vertical passages alternatingly providing upwardly directed fresh air flow and downwardly directed exhaust flow, the passages being connected by vertically spaced openings producing air turbulence.

It is known to provide relatively small transverse openings in the passage walls to provide a pressure balance between the passages.

It is also known from U.S. Pat. No. 4,540,039 to provide such openings for producing air turbulence, which serve as expansion chambers for gases, the resultant turbulences in the gas flow having a favorable effect on the heat exchange between the heat-storing or -absorbing brick walls of the checkerwork and the flowing fluid medium. As is known from U.S. Pat. No. 4,436,144, such checkerworks may be comprised of stacked layers of prismatic bricks of refractory material, each brick having a bottom surface, a top surface and four side walls extending between the bottom and top surfaces, the side walls of the bricks having a progressively decreasing height from layer to layer towards the uppermost checkerwork region, the side walls of each brick defining an octagonal circumferential cross section and a central, vertical through passage of tetragonal cross section, the bricks in each layer being so staggered from the bricks of an adjacent one of the layers that each of a respective superposed layer stacked on a respective underlying layer rests on the top surfaces of four bricks of the underlying layer, the four bricks defining therebetween a through passage in alignment with the through passage of the brick of the superposed layer, the aligned through passages forming the multiplicity of adjacently arranged passages. In the checkerwork disclosed in this patent, all bricks are of the same size. In such a checkerwork, the openings are formed in at least one side wall of each brick, preferably all side walls, and reach to a respective top surface of a respective brick in an underlying layer. The disclosures of these two patents are incorporated herein by way of reference.

This invention is based on the insight that, in addition to the hot surface which a checkerwork system offers for the heat exchange in a given regenerator chamber volume, the heat transfer in the air phase is of decisive importance for the efficiency of such regenerators while the heat transfer in the exhaust gas phase plays a subordinate role.

It is the primary object of the invention to provide a checkerwork for upright regeneration chambers of a glass melting furnace, which conforms to the prevailing conditions in the air phase and thus to improve the heat transfer.

The above and other objects are attained according to the present invention in a checkwork of the indicated construction wherein the vertical distance between vertically adjacent openings becomes progressively smaller towards the uppermost checkerwork region.

The heat is transferred from the hot bricks to the cold combustion air almost exclusively by convection. The entire convective heat transfer is comprised of the force-induced convection due to suction and/or pressure and the free convection due to the rise of hot gases induced by the temperature difference between the checkerwork brick walls and the flowing fluid medium. In the lower region of the checkerwork, the temperature difference between bricks and fresh air is large, causing a strong upward rise. The checkerwork of this invention provides large, smooth hot surfaces, thus enhancing the convective heat transfer due to the rise of hot gases. The temperature difference between bricks and air is reduced progressively towards the upper region of the checkerwork, causing a corresponding reduction in the rising force. The checkerwork of the invention provides more openings in that region for producing air turbulences to enhance the convective heat transfer there.

In the exhaust gas phase of the regenerator, the heat transfer from the exhaust gases to the bricks is effected primarily by radiation, which is effected solely by the width of the flow passage. In glass melting furnaces, the exhaust gases are loaded with considerable amounts of corrosive dusts which have the tendency of being deposited in the lower, colder region of the checkerwork, and this phenomenon is known as aging of the checkerwork. Since the checkerwork of the invention provides large, smooth vertical wall surfaces defining the fluid medium flow passages in the lowermost region of the checkerwork, it has the additional advantage of reducing the tendency for such depositions to occur. For this reason, it is of advantage to keep the lowermost checkerwork region free of the openings producing air turbulence.

The indicated advantages of the present invention will be enhanced if the vertical distance of the two lowermost vertically adjacent openings is up to three times that of the vertically adjacent openings in a region of the checkerwork centrally intermediate the lowermost and uppermost regions while the vertical distance of the two uppermost vertically adjacent openings is up to 0.3 times that of the vertically adjacent openings in the centrally intermediate checkerwork region.

To enable the number of differently sized bricks in the superposed layers of the checkerwork to be reduced to a minimum, it is advantageous to reduce the vertical distance between vertically adjacent ones of the openings stepwise over the height of the checkerwork.

As has been disclosed in U.S. Pat. No. 4,436,144, a high specific hot surface will be obtained if the through passage of each brick has a hydraulic diameter of 120 to 200 mm, the hydraulic diameter being defined by the relationship: four times the through passage cross section divided by the periphery of said cross section, and the ratio of the hydraulic diameter to the wall thickness of the brick, measured in the direction of the main axes extending parallel to the bottom and top surfaces being between 3 and 5. The wall thickness may be, for example, 40 mm.

The turbulence of the combustion air will be increased if the area of the side wall opening in the bricks of median to lowermost height is 0.2 to 0.6 times that of the area of the inner wall of the through passage formed by the respective side wall.

Figure 4:
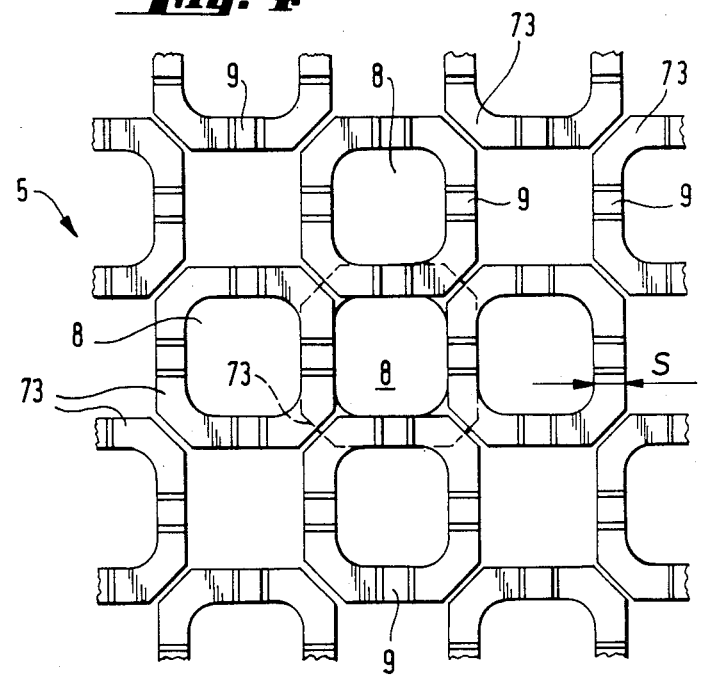
Figures 2, 3:
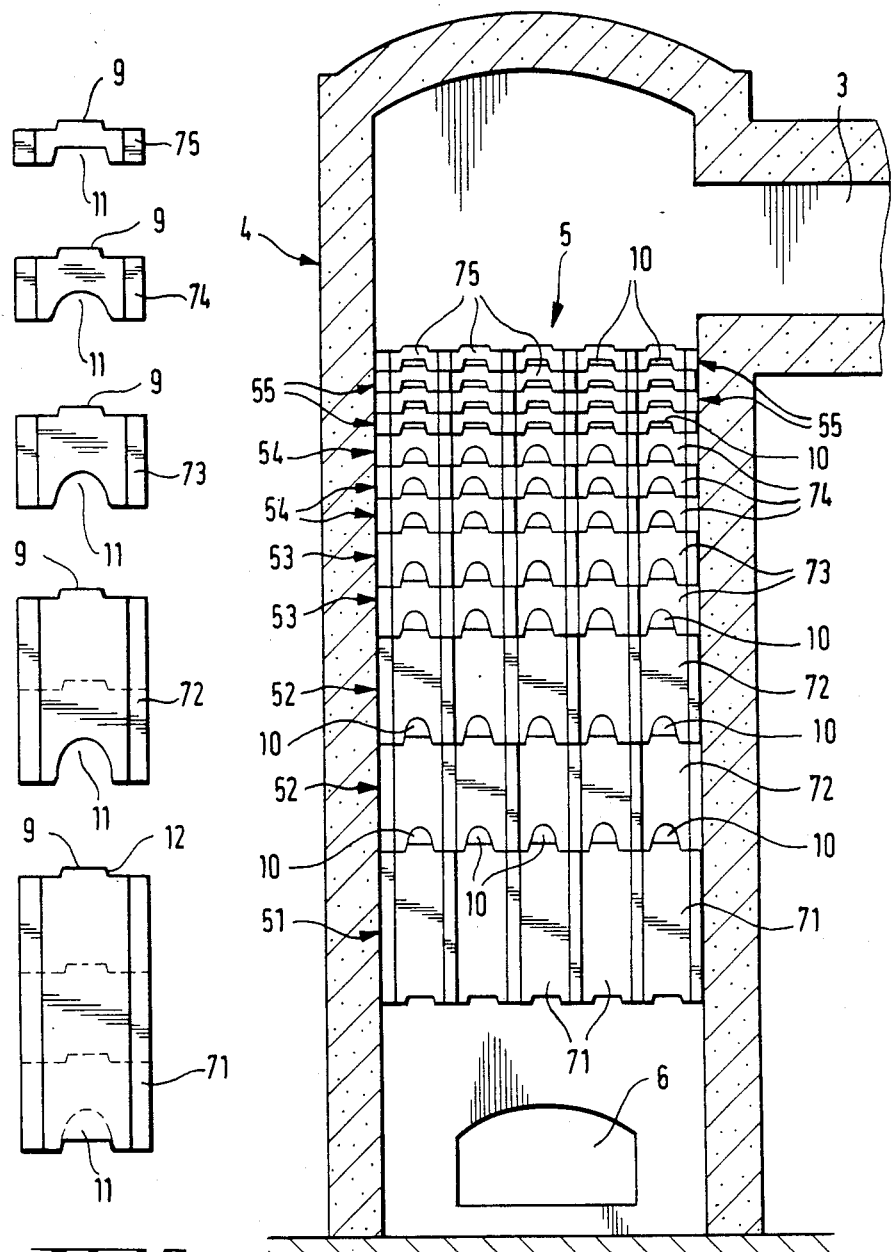

The above and other objects, advantages and features of this invention will become more apparent from the following detailed description of a now preferred embodiment thereof, taken in conjunction with the partially schematic accompanying drawing wherein FIG. 1 is a diagrammatic view of a glass melting surface with two upright regeneration chambers, FIG. 2 shows a regeneration chamber with a checkerwork according to the invention, FIG. 3 illustrates five sizes of bricks for erecting the checkerwork, FIG. 4 is a plan view of one layer of the checkerwork, FIG. 5 is a perspective view showing an embodiment of a hollow brick useful for the checkerwork, and FIG. 6 is a perepctive view of part of the checkerwork, partly in section.

Referring now to the drawing and first to FIG. 1, the illustrated glass melting furnace is shown to comprise trough 1 containing molten bath 2, the trough being lined with refractory material. Passages 3, 3' are arranged at both sides of trough and lead to regenerator chambers 4, 4' and burners (not shown) are mounted in these passages. A respective checkerwork 5, 5' is arranged in each upright regeneration chamber.

In the operation of the furnace, molten bath 2 in trough 1 is heated at one time by the burner mounted in passage 3', the exhaust gases flowing through passage 3 into the regeneration chamber containing checkerwork 5 and heating the bricks of this checkerwork as they pass therethrough. When the bricks of checkerwork 5 have been heated sufficiently, the gas flow is switched over and molten bath 2 is heated by the burner in passage 3, the combustion air passing through opening 6 into chamber 4 and flowing through checkerwork 5 where it is heated by the hot bricks of the checkerwork. At the same time, the exhaust gases flow through passage 3' into chamber 4', passing through checkerwork 5' and heating the bricks of this checkerwork before leaving the chamber through opening 6'.

FIG. 2 schematically shows an embodiment of checkerwork 5 of regeneration chamber 4. As shown, it is comprised of stacked layers 51 to 55 of progressively decreasing height, the height of the layers being reduced stepwise over the height of the checkerwork from the lowermost to the uppermost region. In this figure, layers of the same height are designated by the same reference numeral, a single lowermost layer 51, two layers 52, two layers 53, three layers 54 and four uppermost layers 55 being shown. Each layer, with the exception of layer 51 in the lowermost region of the checkerwork has openings 10 which connect alternatingly arranged adjacent checkerwork passages providing upwardly directed fresh air flow and downwardly directed exhaust flow and produce air turbulence. As shown, the vertical distance between vertically adjacent ones of the openings 10 becomes progressively smaller towards the uppermost checkerwork region stepwise over the height of the checkerwork.

As shown in FIG. 3, the checkerwork is preferably comprised of layers of prismatic hollow bricks of refractory material, wherein the bricks in each layer, except for edge and corner bricks, are of the same size. The highest hollow bricks 71 serve to form lowest layer 51 while decreasingly lower hollow bricks 72, 73, 74 and 75 serve to form successively lower layers 52, 53, 54 and 55, bricks 73 of median height forming layer 53 centrally intermediate the lowermost and uppermost checkerwork regions. Bricks 72 to 75 have openings 11 in their side walls. Opening 11 is indicated in broken lines in brick 71 to indicate that these bricks may have no opening in their side walls at all. As also shown in broken lines, the rather high bricks 71 and 72 may consist of a plurality of superposed like bricks of lower height since it may be difficult to manufacture integral hollow bricks of the desired height.

As is obvious from FIG. 3, bricks 71 to 75 are of essentially the same shape and construction, except for their different side wall heights. Therefore, the brick structure and the manner in which the bricks form the checkerwork, as shown in FIGS. 4, 5 and 6, will be illustrated in connection with median bricks 73.

Bricks 73 are of an octagonal outside contour and have central through passage 8 which is of tetragonal cross section. The bricks are of a substantially uniform wall thickness S. If the bricks are stacked in layers which are offset or staggered relative to each other, vertical passages are formed in one layer of bricks by the inside surfaces of passages 8 and in the respective next layer by the outside surfaces of four adjoining bricks, as shown in broken lines in FIG. 4. As the corners of the outer contour of the bricks are sharp, whereas those of the passage 8 in each brick are rounded, the corner regions of the passages which are formed in this way always have sections which project and are set back, in the vertical direction of the passages, as can be seen from the broken lines in FIG. 4, which indicate bricks 73 of the next layer of bricks. The projecting and set-back portions in the corner regions of the vertically extending passages result in the formation of turbulent flow in the passages and thus improve the degree of heat transfer. The projecting and set-back portions can also be seen from FIG. 6 in which only half of some bricks 73 are shown.

In order to facilitate stacking of the bricks or building checkerworks 5, 5', the bottom or the top surface of each brick, i.e. the top surface in the illustrated embodiment, has elevated portions 9 and the other surface, i.e. the bottom surface in the illustrated embodiment, has corresponding depressed portions. A recess in the bottom surface forms opening 11, extending from through passage 8 to a respective outer wall from all the inner walls of brick 73. Elevated portions 9 have beveled end faces 12 extending perpendicularly to the major axes of the top surfaces and the corresponding or congruent depressed portions are defined by bottom ends of recesses 11 having congruent beveled end faces 13. This configuration greatly facilitates stacking of the bricks and locking them together in the stacked conditions in the checkerwork.

Any suitable refractory material may be used for the bricks, such as magnesia, chromium ore, magnesium-aluminum spinell, clay or alumina, mixtures of these materials, as well as sinters thereof, for example magnesia chromite, forsterite or chamotte.

What is claimed is:

1. A checkerwork for two upright regeneration chambers of a glass melting furnace, the checkerwork rising from a lowermost region to an uppermost region and defining a multiplicity of adjacently arranged vertical passages alternatingly providing upwardly directed fresh air flow and downwardly directed exhaust flow, the passages being connected by vertically spaced openings producing air turbulence, and the vertical distance between vertically adjacent ones of the openings becoming progressively smaller towards the uppermost checkerwork region.

2. The checkerwork of claim 1, wherein the lowermost checkerwork region is free of said openings.

3. The checkerwork of claim 1, wherein the vertical distance of the two lowermost vertically adjacent openings is up to three times that of the vertically adjacent openings in a region of the checkerwork centrally intermediate the lowermost and uppermost regions while the vertical distance of the two uppermost vertically adjacent openings is up to 0.3 times that of the vertically adjacent openings in the centrally intermediate checkerwork region.

4. The checkerwork of claim 1, wherein the vertical distance between vertically adjacent ones of the openings is reduced stepwise over the height of the checkerwork.

5. The checkerwork of claim 1, comprised of stacked layers of prismatic bricks of refractory material, each brick having a bottom surface, a top surface and four side walls extending between the bottom and top surfaces, the side walls of the bricks having a progressively decreasing height from layer to layer towards the uppermost checkerwork region, the side walls of each brick defining an octagonal circumferential cross section and a central, vertical through passage of tetragonal cross section, and the openings being formed in at least one of the side walls of each brick, the openings reaching to a respective top surface of a respective one of the bricks in an underlying one of the layers.

6. The checkerwork of claim 5, wherein the bricks in each layer are so staggered from the bricks of an adjacent one of the layers that each of a respective superposed layer stacked on a respective underlying layer rests on the top surfaces of four bricks of the underlying layer, the four bricks defining therebetween a through passage in alignment with the through passage of the brick of the superposed layer, the aligned through passages forming the multiplicity of adjacently arranged passages.

7. The checkerwork of claim 5, wherein the octagonal circumferential cross section has sharp corners and the central, vertical through passage of tetragonal cross section has rounded corners.

8. The checkerwork of claim 5, wherein the through passage of each brick has a hydraulic diameter of 120 to 200 mm, the hydraulic diameter being defined by the relationship: four times the through passage cross section divided by the periphery of said cross section, and the ratio of the hydraulic diameter to the wall thickness of the brick, measured in the direction of the main axes extending parallel to the bottom and top surfaces being between 3 and 5.

9. The checkerwork of claim 5, wherein the openings are formed in each side wall.

10. The checkerwork of claim 5, wherein the area of the side wall opening in the bricks of median to lowermost height is 0.2 to 0.6 times that of the area of the inner wall of the through passage formed by the respective side wall.

* * * * *